Feb. 25, 1936.  E. E. VINCENT  2,031,749
POWER TRANSMISSION APPARATUS
Filed Dec. 16, 1932  4 Sheets-Sheet 1
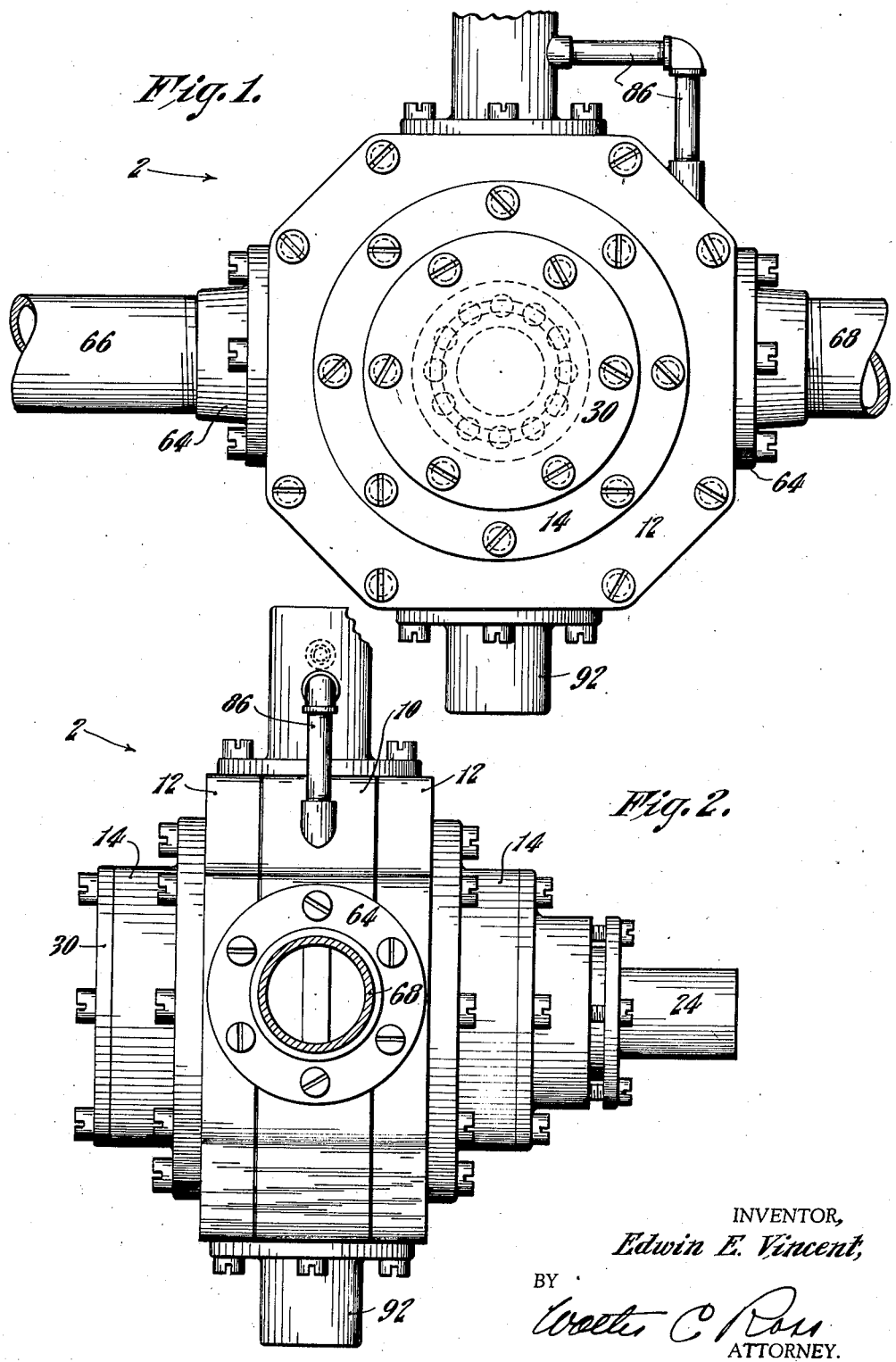
INVENTOR,
Edwin E. Vincent,
BY
ATTORNEY.

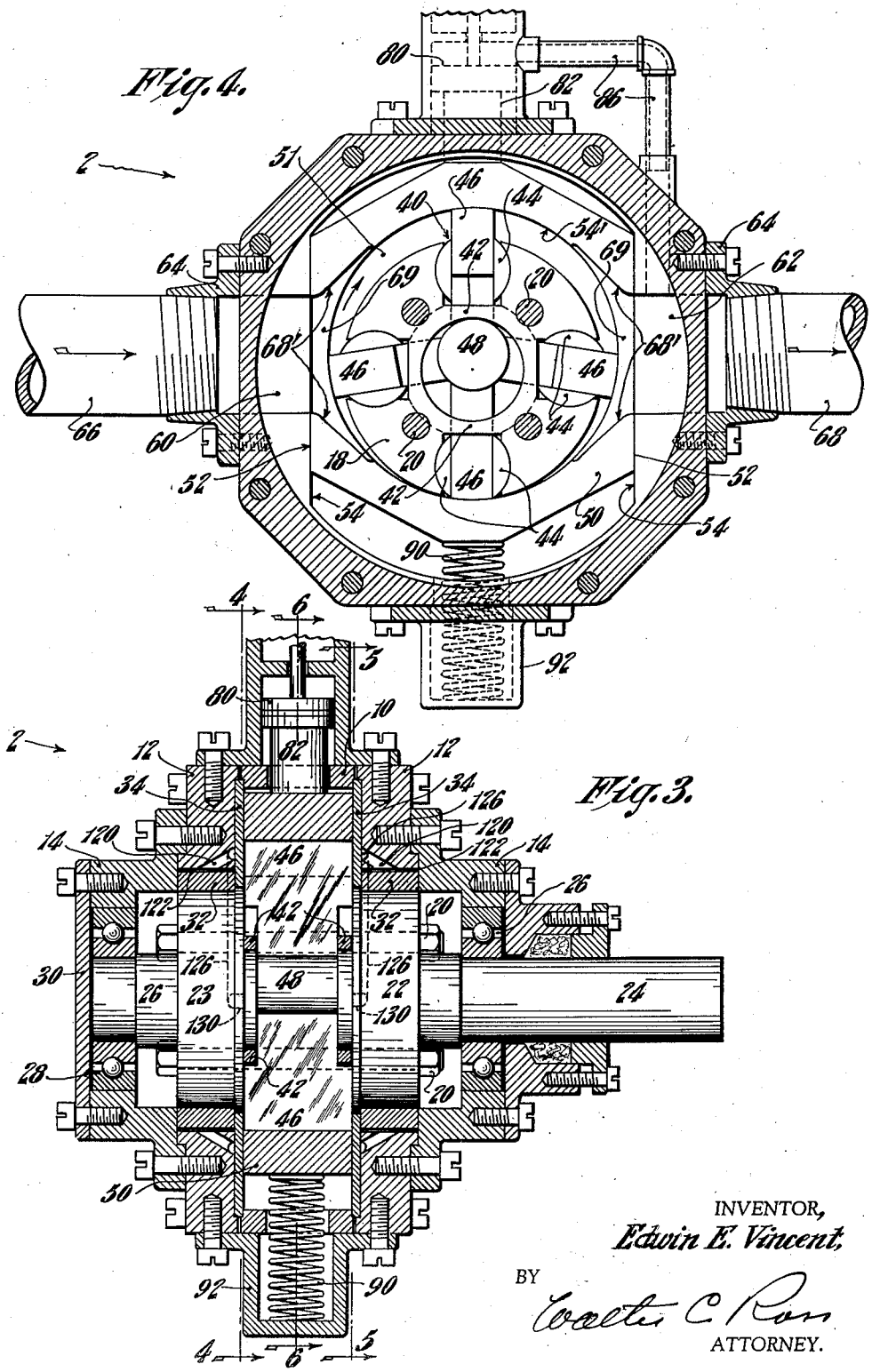

Feb. 25, 1936.  E. E. VINCENT  2,031,749
POWER TRANSMISSION APPARATUS
Filed Dec. 16, 1932  4 Sheets-Sheet 3

INVENTOR,
Edwin E. Vincent,
BY
ATTORNEY.

Feb. 25, 1936.  E. E. VINCENT  2,031,749
POWER TRANSMISSION APPARATUS
Filed Dec. 16, 1932  4 Sheets-Sheet 4
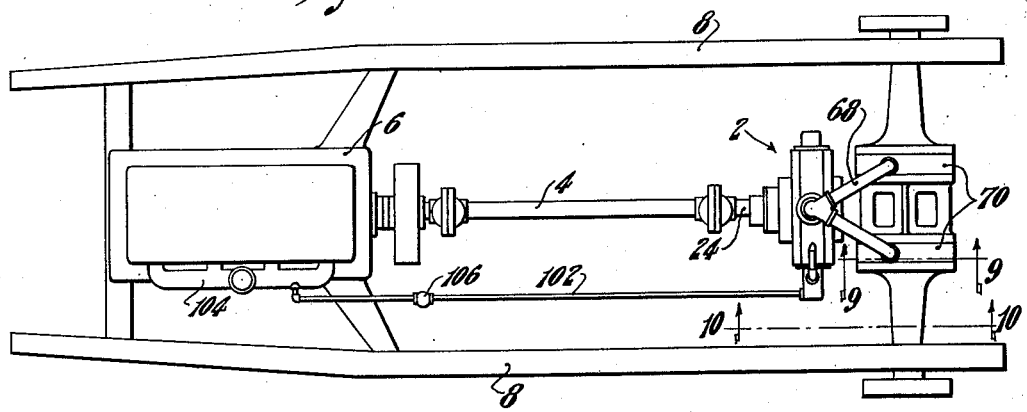
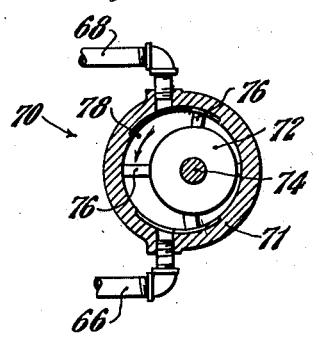
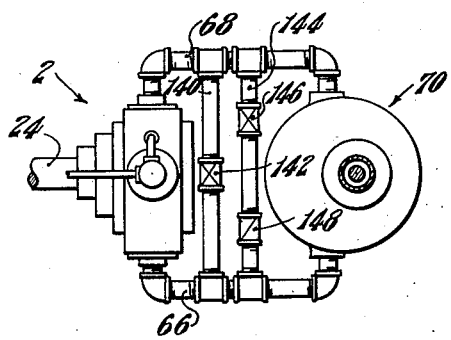
INVENTOR,
Edwin E. Vincent,
BY
ATTORNEY.

Patented Feb. 25, 1936

2,031,749

UNITED STATES PATENT OFFICE 2,031,749

POWER TRANSMISSION APPARATUS

Edwin E. Vincent, Springfield, Mass.

Application December 16, 1932, Serial No. 647,631

3 Claims. (Cl. 103—136)

This invention relates to improvements in power transmission apparatus and is directed more in particular to improvements in apparatus of the class described wherein the power transmitted may be varied and the speed and direction of rotation of the driven unit may be changed.

The principal objects of the invention are directed to the provision of power transmission apparatus wherein a driving unit delivers fluid to operate a driven unit in combination with means to automatically vary the amount and pressure of the fluid as well as its direction of flow.

Various novel features and advantages of the novel structure of the invention will be more fully hereinafter referred to in connection with the accompanying description of the invention in the form at present preferred. While the novel features of the invention for purposes of disclosure are shown and described in connection with the application of the invention to a motor vehicle, it will be readily appreciated that the invention in its various aspects is capable of use with apparatus of all kinds.

In the drawings,

Fig. 1 is a side elevational view of a driving or driven unit embodying the novel features of the invention.

Fig. 2 is an end elevational view of the same.

Fig. 3 is a longitudinal sectional view through the unit shown in Figs. 1 and 2.

Figure 5:
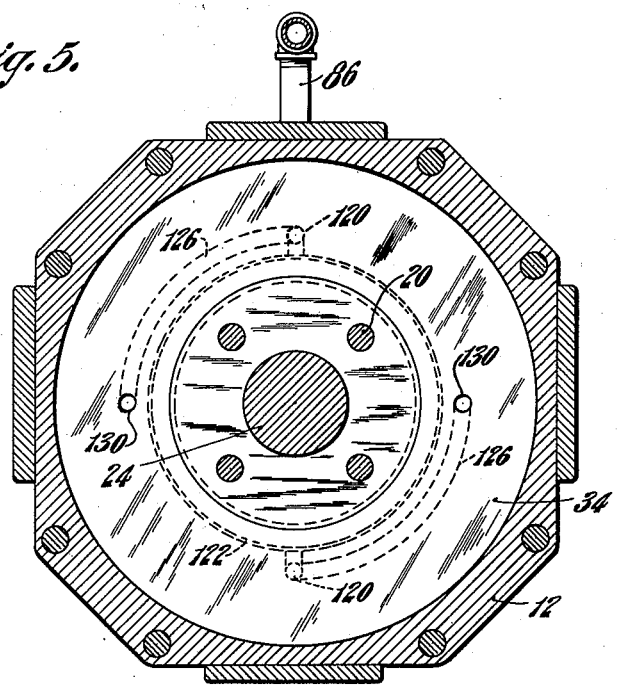
Figure 6:
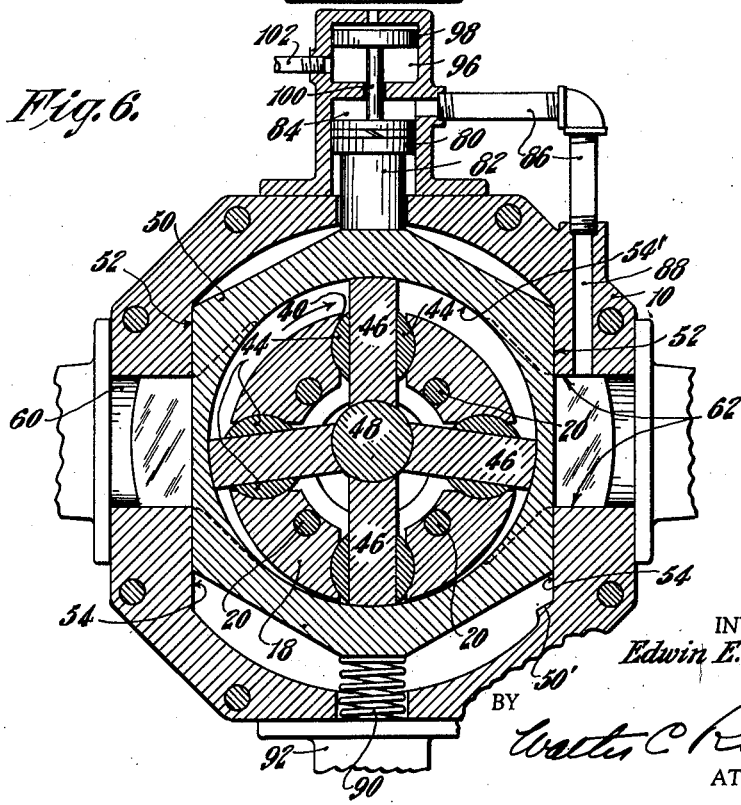

Figs. 4, 5 and 6 are sectional elevational views taken on the lines 4—4, 5—5 and 6—6 respectively of Fig. 3.

Fig. 7 is a plan view of a motor vehicle showing the apparatus of the invention associated therewith.

Fig. 8 is a sectional view through a two-way valve.

Fig. 9 is a sectional view on the line 9—9 of Fig. 7, and

Fig. 10 is a sectional view on the line 10—10 of Fig. 7.

Referring now to the drawings more in detail the invention will be fully described. It will be understood that the novel features thereof are adapted for various uses and that in describing the invention in connection with a motor vehicle it is not intended to be so limited.

The invention in a general way consists of a power or driving unit which is shown in detail in Figs. 1 to 6 inclusive. This unit in the particular embodiment of the invention shown functions as a driving unit and as shown in Fig. 7 the unit 2 is driven from a shaft 4 of an engine 6 which is associated with the side frames 8 of a motor vehicle. The unit which is thus driven from the motor in turn drives other units by delivering fluid thereto, as will later appear.

The unit 2 consists of a casing formed by a central ring-like member 10, end members or plates 12 at opposite sides thereof and bearing housings 14 located outside the end members or plates 12. These may be bolted together as shown or they may be made integral if desired.

A central rotor or fluid propeller 18 within the casing has secured to its opposite sides as by bolts 20 other end rotors 22 and 23. The rotor 22 has a shaft 24 which is arranged for rotation in a ball bearing structure 26 within one of the members 14 and this shaft 24 may be connected to the source of power such as the shaft 4 of the engine 6. A suitable stuffing box construction as shown in Fig. 3 may be provided for this shaft. The other end rotor 23 has a shaft 26 which is journalled in a ball bearing construction in the other member 14, all as shown. A plate 30 closes the end of the member 14 at the left as shown in Fig. 3.

Relatively thin ring-like plates 34 are provided at opposite sides of the central rotor and are preferably seated in depressions on the inner adjacent faces of the members 12. One of the ring-like members 34 is shown in plan in Fig. 5. The central rotor 18, (see Figs. 3, 4 and 6) is slotted radially as at 40, the slots terminating at a distance from the opposite side faces thereof so as to provide ring-like sections 42 at the ends of the slots 40. The inner adjacent faces of the slots 40 are provided with curving seats to receive guide members 44 as shown which may rock therein.

Blades 46 are slidable between the guide members 44 and have curving inner ends as shown to bear on a central plug member 48. The guide members may rock in the seats whereby the blades may work back and forth in the slots 40.

A slide cylinder 50 has its opposite sides 52 in sliding engagement with guideways 54 of an opening provided in the member 10, as shown. This is so the cylinder may freely move up and down. The cylinder is bored with a central opening as shown to provide a cylindrical surface 54'. The blades 46 previously described have outer curved ends in sliding engagement with the surface 54' so that as the rotor rotates the outer ends of the blades slide over this surface 54'.

It will be observed that the rotor 18 is rotatable on a fixed axis and that the cylinder is movable transversely to said axis so that the central bore thereof may be concentric or eccentric relative to the axis of rotation of the rotor. Oppositely disposed blades 46 and the center plug 48 are in their overall lengthwise dimensions substantially equal to the diameter of the bore through the cylinder so that the outer ends of the blades are always in wiping contact with the surface 54' regardless of the position of the cylinder relative to the axis of rotation of the rotor. The plug acts as a filler between opposite blades to hold the outer ends in contact with the surface 54' of the bore of the cylinder. Openings 60 and 62 such as an inlet and outlet are provided at opposite sides of the central member 10 and flanges 64 may be secured to this member 10 for receiving an inlet pipe 66 and an outlet pipe 68. The forward and rear faces of the cylinder 50 are provided with depressions defined by lines 68' to provide passageways past the cylinder and leaving a central web-like portion 69 intermediate opposite faces of the cylinder to provide the continuous circular surface 54'. Fluid may enter the inlet 66, flow through opening 60 and through the passageways of the cylinder into the space 51 (see Fig. 4) between the uppermost side of the rotor 18 and the bore of the cylinder. In this way fluid is propelled by the blades of the rotor and passes out through the depressions at the other side of the cylinder and through the discharge port 62 into pipe 68. As will later appear the inlet and outlet 60 and 62 described may become the outlet and inlet respectively.

In the drawings it will be noticed that the cylinder 50 is in its upper position so that the space 51 between the upper side of the rotor and the adjacent side of the bore in the cylinder is greater than between the lower side of the rotor and bore. With a certain space between the rotor at its upper side and the adjacent side of the bore in the cylinder a certain amount of fluid will be passed by the unit. By decreasing the space as by lowering the cylinder the amount will be decreased.

In partially describing the operation of the unit 2 reference will be made to Figs. 7, 8, 9 and 10.

The unit just described which is indicated at 2 in Fig. 7 has its discharge port 62 or high pressure side connected by pipes 68 to inlets of driven units represented by 70 although of course it may be connected to a single driven unit. The inlet port 60 or low pressure side of the valve is connected by similar pipes 66 to the discharge or outlet sides of said units.

These units represented by 70 are for driving the axles and wheels at the rear end of the vehicle and one of said units is shown in section in Fig. 9. A rotor 72 is secured to an axle shaft 74 and carries blades 76. The rotor 72 is located in a bore of a casing 71 of the unit and as fluid is delivered by the unit 2 through the connection 68 the rotor of the unit is rotated to drive shaft 74.

The construction of the unit or units 70 may if desired be similar to the unit shown in Figs. 1 to 6, inclusive, and the movable cylinder may be omitted. For purposes of description it will be assumed that as the rotor 18 is rotated from the engine 20 whereby it delivers fluid to the unit or units 70 which discharges the fluid through the connection 66 so that it flows back again into the power unit 2. In this way the driven units are operated by the unit 2.

With the cylinder 50 of the unit 2 in some upper position to provide a space 51 above the rotor 18 and by driving the rotor at a certain speed it will deliver a certain volume of fluid to the driven unit at a certain pressure. By moving the cylinder of the unit 2 downwardly so as to decrease the space 51 while driving the rotor at the same speed the volume of fluid delivered and the pressure thereof is varied. In this way the amount of fluid and its pressure delivered to the driven units may be varied. By varying the speed of the rotor 18 by varying the speed of the engine, the speed of the rotors of the driven units may also be varied.

Moving the cylinder downwardly so that the center line of the bore therethrough is below the axis of rotation of the rotor causes the space below the rotor to become greater than at the top wherefor fluid is then taken in at 62 and delivered at 60. That is the outlet becomes the inlet and the inlet becomes the outlet, whereby the direction of rotation of the driven unit is reversed.

Means is provided for automatically moving the cylinder downwardly from the position shown in Fig. 4, for starting the vehicle forwardly. That is, the cylinder is moved downwardly so as to change the amount of fluid delivered by the unit and its pressure to overcome the excessive overload inherent in starting a vehicle or any other apparatus. This is accomplished automatically as follows. A piston 80 is connected by a rod 82 to valve 50 and is slidable in a cylinder 84. The cylinder 84 is connected by pipes 86 and a channel 88 to the outlet 62 of the unit or what may be called the normally high pressure side thereof.

In the initial starting of the driven units the power required for operating the said units is excessive so as to initially overload the unit 2. In order to overcome the excessive requirements pressure is built up at the high pressure side of the unit. This is transmitted by means of the pipes 86 and passageway 88 to the upper side of the piston 80 and acts on the piston 80 to move the cylinder 50 downwardly against the action of a spring 90 below the cylinder and bearing in a spring seat member 92. In this way the cylinder is moved to a lower position than that shown so as to provide less space between the rotor and the bore in the valve. A less amount of fluid is delivered by the rotor but at an increased pressure the product of which overcomes the starting torque. When the starting torque however is overcome and so that the unit delivers the normal requirements for driving the units the pressure at the high pressure side of the unit decreases and the spring tends to move the cylinder upwardly to its normal operating position. In this way the unit as it is driven by the engine automatically overcomes excessive demands required of it and various effects may be obtained by varying the characteristics of the spring, size of piston 80 etc. A stop such as 50' may be provided to limit the lowering movement of the valve 50.

A second cylinder 96 above the cylinder 84 has a piston 98 reciprocable therein which is suitably connected as by a rod 100 to the piston 80. A pipe 102 connects the cylinder 96 with an intake manifold 104 of the engine 6 and a control valve 106 is provided in the pipe connection.

The valve 106 as shown in Fig. 8 includes a plug 108 rotatable in a body 116 which is provided with a through passageway 110 and a passageway 112 leading thereinto. A vent port 114 is provided in a casing 116 of the valve.

When it is desired to reverse the flow of fluid between the driving and driven units the valve plug 108 is rotated so that the passage 110 is at right angles to the position shown with the passageway 112 opposite to the vent port 114. In this way the cylinder 96 and manifold 104 are in communication whereby the piston 98 is moved downwardly so as to move the cylinder 50 downwardly and thereby provide a larger space between the lower side of the rotor and bore of the cylinder. In this way the fluid is delivered through port 60 and returns to unit 2 through the port 62 and in that way reverses the direction of rotation of the rotors of units 70.

Passageways 120 (see Figs. 3 and 5) extend outwardly and downwardly from the inner faces of the members 12 and into communication with the spaces 122 between rings 32 carried on the outer rotors 22 and 23 and their bearings in the members 12. Annular groves 126 on the inner faces of the members 12 extend from the passageways 120 so that their opposite ends register with openings 130 through the plate-rings 34. Thus the spaces between the upper sides of the rings 32 and members 12 are in communication with the inlet or low pressure side of the unit while the said spaces below the rings 32 are in communication with the high pressure side of the unit. As the rotor rotates, pressure is transmitted from the high pressure side of the unit to a point beneath the rings 32 which acts in an upward direction and tends to support the rotors during rotation while the pressure may pass around the rings outwardly through the upper passageways 120 and back to the low pressure side. This is useful in overcoming forces tending to move the rotor downwardly and assists the bearings in properly supporting the rotor for the rotative movements.

A connection 140 is provided between the pipes or connection 66 and 68 which includes a valve 142. A second connection 144 also connects the pipes 66 and 68 and includes a valve 146 and a check valve 148. By opening and closing these valves different effects may be obtained. That is certain units may be caused to idle or may be caused to rotate in one direction only.

In operation the unit is driven from a source of power as explained so that its rotor delivers fluid under pressure for operating a driven unit. Under normal operating conditions the speed of the driven unit may be varied by varying the speed of the primary power supplying unit. When the demands on the power unit exceed the normal, the cylinder is automatically moved so that the unit delivers a sufficient volume of fluid under the necessary pressure to overcome the demands when again the valve is returned to the normal operating position. When it is desired to reverse the direction of the driven unit or units the cylinder in the driving unit is shifted to bring about a change in direction of flow of liquid.

Various changes may be made in the form of the apparatus to adapt it for various uses without departing from the spirit and scope of the invention, wherefor, I prefer to be limited, if at all, by the appended claims rather than by the foregoing description.

I claim:

1. An apparatus of the class described comprising in combination, a housing, a cylinder slidable therein having a central cylindrical bore, a rotor journalled in said housing having a central axial opening and with radially disposed slots extending into said central opening, ring-like sections at opposite sides of the rotor adjacent the central opening closing the radial slots at opposite sides adjacent the inner ends thereof, a substantially rigid floating member in said central opening of the rotor, pairs of guide members oscillatable at opposite sides of said slots, blades between said members having inner concave ends engaging and slidable on said floating member and outer convex ends slidable in the bore of the cylinder, the lower end portions of said blades being relatively narrower than the upper portions thereof whereby the opposite sides thereof are slidable on the inner sides of said ring-like sections so that the said blades are held against sidewise movements.

2. An apparatus of the class described comprising in combination, a housing having ports at opposite sides thereof, a cylinder reciprocable therein having a bore, means to reciprocate said cylinder, a rotor structure having a central rotor rotatable in said bore and end rotors at opposite sides thereof and a shaft journalled in said housing, the central rotor having pairs of spaced guide members oscillatable therein, a substantially rigid floating plug, blades between the pairs of guide members having their inner ends slidably engaging said plug and their outer ends slidably engaging the bore of the cylinder, ring-like plates seated in the housing at opposite sides of the central rotor and passageways associated with said plates and housing providing communication between the ports and journals between the end rotors and housing whereby pressure in the ports is communicated to said journals.

3. An apparatus of the class described comprising in combination, a housing having a cylinder chamber and inlet and outlet ports leading thereinto, a cylinder reciprocable therein in opposite directions having a central bore disposed on an axis transverse to the plane of its reciprocation and pasageways leading from opposite sides of the bore into said ports, a central rotor in said bore of the cylinder provided with an axial bore and radial slots rotatable on a substantially fixed axis, end rotors secured to opposite sides of the central rotor journalled loosely for rotation in said housing to provide spaces between said end rotors and housing, shafts extending outwardly from said end rotors supporting all of said rotors and journalled in said housing outside said end rotors, oscillatable guides in opposite sides of said slots of the central rotor, radial blades slidable in said guides having their outer ends in wiping contact with the bore of the cylinder, a substantially rigid cylindrical plug floatingly disposed in the axial bore of the central rotor, the said blades having their inner ends in sliding contact with said plug and being unattached, the said housing provided with seats at opposite sides of the central rotor, plates non-movable in said seats with which the sides of the cylinder and central rotor are in sliding contact, the said housing and plates provided with passageways extending between said ports and the journal bearings between said end rotors and housing, and means to reciprocate said cylinder.

EDWIN E. VINCENT.